(12) United States Patent
Herwig

(10) Patent No.: US 7,900,840 B2
(45) Date of Patent: Mar. 8, 2011

(54) METHODS AND APPARATUS FOR DIRECTING BAR CODE POSITIONING FOR IMAGING SCANNING

(75) Inventor: Nathaniel C. Herwig, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 325 days.

(21) Appl. No.: 11/865,818

(22) Filed: Oct. 2, 2007

(65) Prior Publication Data

US 2009/0084855 A1    Apr. 2, 2009

(51) Int. Cl.
*G06K 7/10*    (2006.01)
(52) U.S. Cl. .............................. 235/462.43; 235/462.41
(58) Field of Classification Search ............. 235/462.41, 235/462.2, 462.14, 462.43
See application file for complete search history.

(56) References Cited

U.S. PATENT DOCUMENTS

| | | | | |
|---|---|---|---|---|
| 5,534,684 | A * | 7/1996 | Danielson | 235/472.02 |
| 5,821,512 | A * | 10/1998 | O'Hagan et al. | 235/383 |
| 6,276,605 | B1 * | 8/2001 | Olmstead et al. | 235/462.41 |
| 7,083,098 | B2 * | 8/2006 | Joseph et al. | 235/454 |
| 7,163,150 | B2 * | 1/2007 | Kricorissian et al. | 235/462.21 |
| 2008/0296383 | A1 * | 12/2008 | Gurevich et al. | 235/462.21 |

* cited by examiner

*Primary Examiner* — Michael G Lee
*Assistant Examiner* — Tabitha Chedekel
(74) *Attorney, Agent, or Firm* — Peter Priest

(57) ABSTRACT

Systems and techniques for improved imaging scanning. An imaging bar code scanner provides indicia to a user indicating areas for placement of a bar code so as to provide for efficient imaging scanning. The indicia may define the boundaries of the field of view of an imager, and may also indicate areas of an image that are more intensively processed. The indicia may be projected so as to illuminate an object with a projected pattern, or may alternatively be projected onto or otherwise placed on one or more scan windows of a scanner. At least some of the indicia may change appearance depending on whether an object to be scanned is within a prescribed distance from an imager.

17 Claims, 6 Drawing Sheets

METHODS AND APPARATUS FOR DIRECTING BAR CODE POSITIONING FOR IMAGING SCANNING

FIELD OF THE INVENTION

The present invention relates generally to improvements to bar code scanning. More particularly, the invention relates to improved systems and techniques for indicating an optimum position for a bar code to be scanned by imaging scanning.

BACKGROUND OF THE INVENTION

Retail checkout operations, have used bar code scanning for many years, and bar code scanning has proven to be of great value in numerous other applications as well. Improved efficiency and accuracy of bar code scanning typically leads to improved efficiency of operations in which such scanning is used. One promising bar code scanning technology is imaging scanning, involving the capture and processing of a visual image of a bar code by an imaging device such as a digital camera, in order to extract bar code information. One important aspect of providing efficient imaging bar code scanning is the ability to quickly locate the bar code. The process of imaging scanning is essentially the analysis of a highly detailed photographic image. Filtering and manipulation of the image can help to simplify the processing, but analysis is typically a highly computationally intensive task. The initial capturing of the image typically does not distinguish the bar code from surrounding features of the image. That is, an image within a particular field of view is captured, and then processing is performed to identify and analyze the portion of the image representing the bar code.

SUMMARY OF THE INVENTION

Among its several aspects, the present invention recognizes that control of the capturing of the image so as to reduce processing of captured extraneous material would be highly advantageous. If the position of the bar code in the field of view of an imager can be to some extent known, a processing algorithm can be designed to adapt processing to take into account the expectation that a bar code will be in a particular location, for example, performing more intensive processing in an expected location of a bar code and performing less intensive processing in what are expected to be background areas.

In addition, a typical imaging scanner has an ideal distance from the imager at which the best processing occurs. Especially for very small bar codes, for which imaging scanning is particularly useful, it is highly desirable for the bar code to be placed an optimum distance from the imager in order for efficient scanning to occur.

The present invention addresses these issues, as well as others, by providing for indicators for appropriate positioning of a bar code. A scanning field, such as a scan window, is provided with indicia indicating appropriate positioning in the field. For example, an illuminated grid, such as an intersecting horizontal and vertical line may be imposed on the window, for example, suitably channeled laser illumination, a projection onto the screen, or a design physically superimposed on the scan window. A design may be superimposed, for example, through painting, etching, or silk screen printing. In addition, a sensor may detect the distance of a bar code from the imager, and a targeting beam may be used to illuminate the bar code. When the sensor detects that the bar code is within a prescribed distance range from the imager, the appearance of the targeting beam may change. For example, the beam may change from red to green in color when the bar code is within the prescribed distance range.

DETAILED DESCRIPTION

Figure 1:
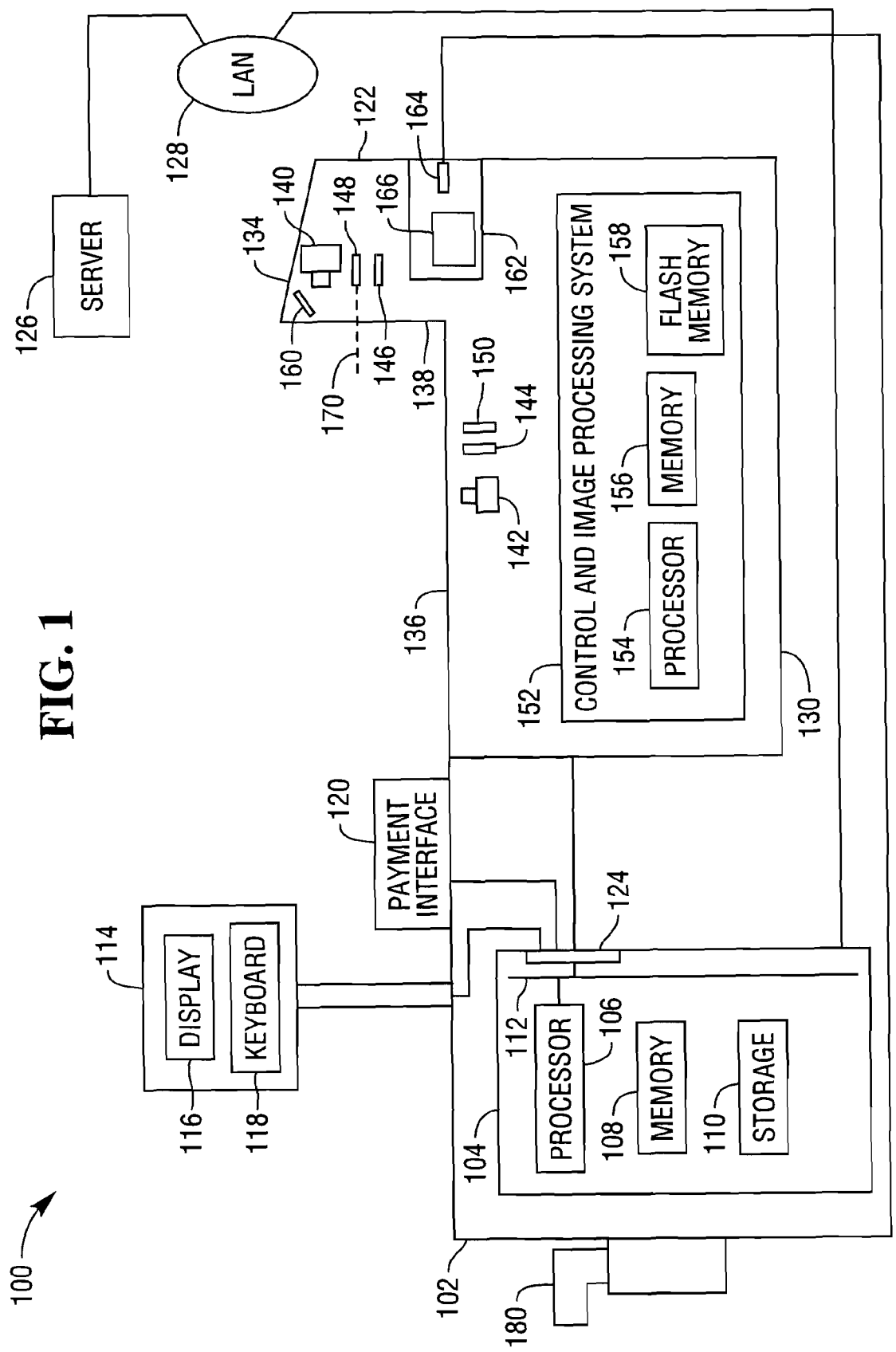
FIG. 1 illustrates a checkout system employing a scanner according to an aspect of the present invention.

FIG. 1 illustrates a checkout system 100 according to an aspect of the present invention. The system 100 includes a point of sale terminal 102, suitably including a computer 104. The computer 104 may suitably include a processor 106, high speed memory 108, long term storage 110, all communicating over a bus 112. The terminal 102 may employ a user interface 114, including a keyboard 116 and display screen 118. The user interface 114, as well as a payment interface 120, and scanner/scale combination 122, communicate with the computer 104 through one or more interface connections, such as the interface 124. The interface 124 may suitably be a set of universal serial bus (USB) ports, a combination of USB ports and other types of ports, or any other combination of communication connectors or other connection mechanisms, such as wireless links suitable to the context and environment in which the system 100 is to be employed. The computer 104 may communicate with a central server 126 over a local area network 128, which may include wired or wireless communication links, or both.

The scanner 122 includes a base 130, a tower section 134, and horizontal and vertical scan windows 136 and 138. The scanner 122 also includes imaging devices, such as digital cameras 140 and 142, distance sensors 144 and 146, target illuminators 148 and 150, and a control and image processing system 152. The control and image processing system 152 may suitably include a processor 154, memory 156, and long term storage such as flash memory 158. The scanner 122 includes a target grid projector 160, suitably mounted in the tower section 134, and oriented to project a targeting grid onto the horizontal window 136. The scanner also includes a targeting grid illuminating system 162, including a laser 164 and an optics system 166, for directing a desired pattern onto the vertical window 138. Numerous alternative mechanisms may be used for presenting a desired pattern on one or both of the windows 136 and 138, such as painting or etching of pattern elements, or the use of electroluminescent wires embedded into a window.

In many cases, it will be advantageous not only to place a bar code at or near a particular position with respect to a scan window, but to position the bar code within a specified distance range from the scan window, such as between 1 and 2 inches from the scan window, in order to place the bar code at or near an ideal focusing distance from the imager. A targeting beam, for example, the targeting beam 170, may be emitted by a target illuminator, for example the target illuminator 148. A bar code may be placed in the path of the targeting beam 170 by a user.

The distance sensors 144 and 146 may suitably be infrared sensors, directing a beam past the windows 136 and 138, respectively, and receiving reflections from objects in the path of the beams, or may be focus sensors, or any other type of sensor suited to use in the scanner 100. When the distance to an object is determined by one of the sensors 144 and 146, a signal indicating the distance is directed to the control and processing system 152. When the determined distance is within a predetermined range, the control and processing system 152 directs the target illuminator 148 to change the appearance of the targeting beam 170. For example, the targeting beam 170 may be changed so as to present a different shape, or may be changed in color, for example, from red to green. The user is thus informed when the bar code is at a proper distance from the scan window 138 and is therefore able to more quickly place the bar code at that proper distance.

In addition to the scanner/scale combination 122, the checkout station may also include a handheld scanner 180. The handheld scanner 180 may be held near a bar code and activated so as to capture an image of the bar code area. As discussed further below, the handheld scanner 180 suitably projects a targeting pattern onto a countertop, or onto an object to be scanned, so that proper placement of a bar code with respect to the targeting pattern will produce efficient image scanning of the bar code.

Figure 2:
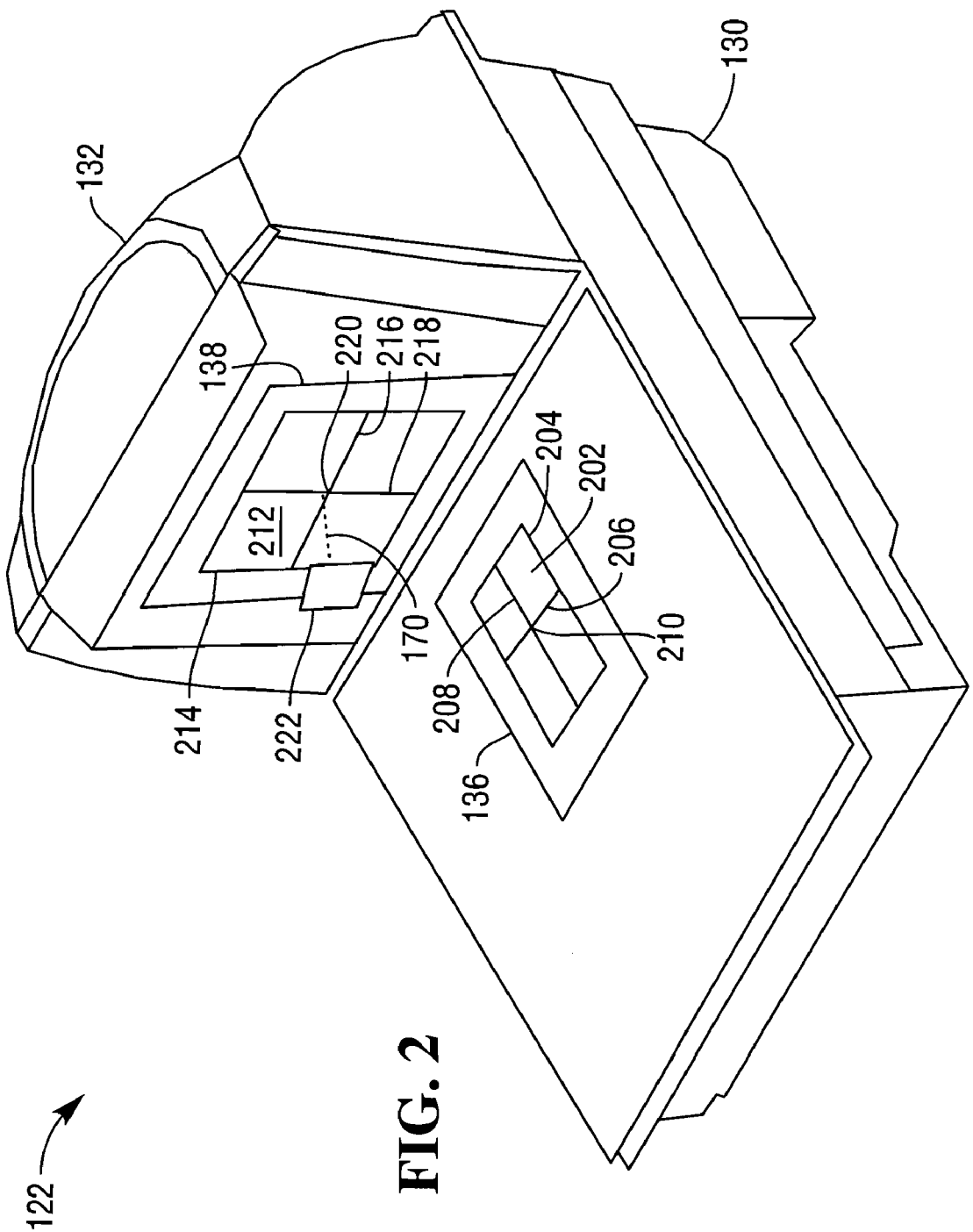
FIG. 2 illustrates an additional view of a scanner according to an aspect of the present invention.

FIG. 2 illustrates an external view of the scanner 122, removed from the checkout station 100. The base 130, tower section 132, and horizontal and vertical scan windows 136 and 138 can be seen in FIG. 2. The targeting beam 170 can also be seen emerging from the scan window 138. A targeting pattern 202 may be seen on the horizontal scan window 136, comprising a border 204, indicating the extent of the scan window 136 that is within the field of view of the digital camera 142. The targeting pattern 202 includes horizontal and vertical lines 206 and 208, and the intersection 210 of the lines 206 and 208 indicates a desired location for placement of a bar code for image scanning at the window 136. Similarly, a targeting pattern 212 may be seen on the horizontal scan window 138, comprising a border 214, indicating the extent of the scan window 138 that is within the field of view of the digital camera 140. The targeting pattern 212 includes horizontal and vertical lines 216 and 218, and the intersection 220 of the lines 216 and 218 indicates a desired location for placement of a bar code for image scanning at the window 138. The targeting beam 170 can be seen emerging from the scan window 138, striking an object 222 held in position before the scan window 138. When the object 222 is within a predetermined distance range from the scan window 138, the targeting beam 170 will take on a predetermined appearance, for example, casting a predetermined pattern onto the object 222, or taking on a green color, rather than, for example, a red color indicating that the object 222 is outside of the predetermined distance range.

Figure 3:
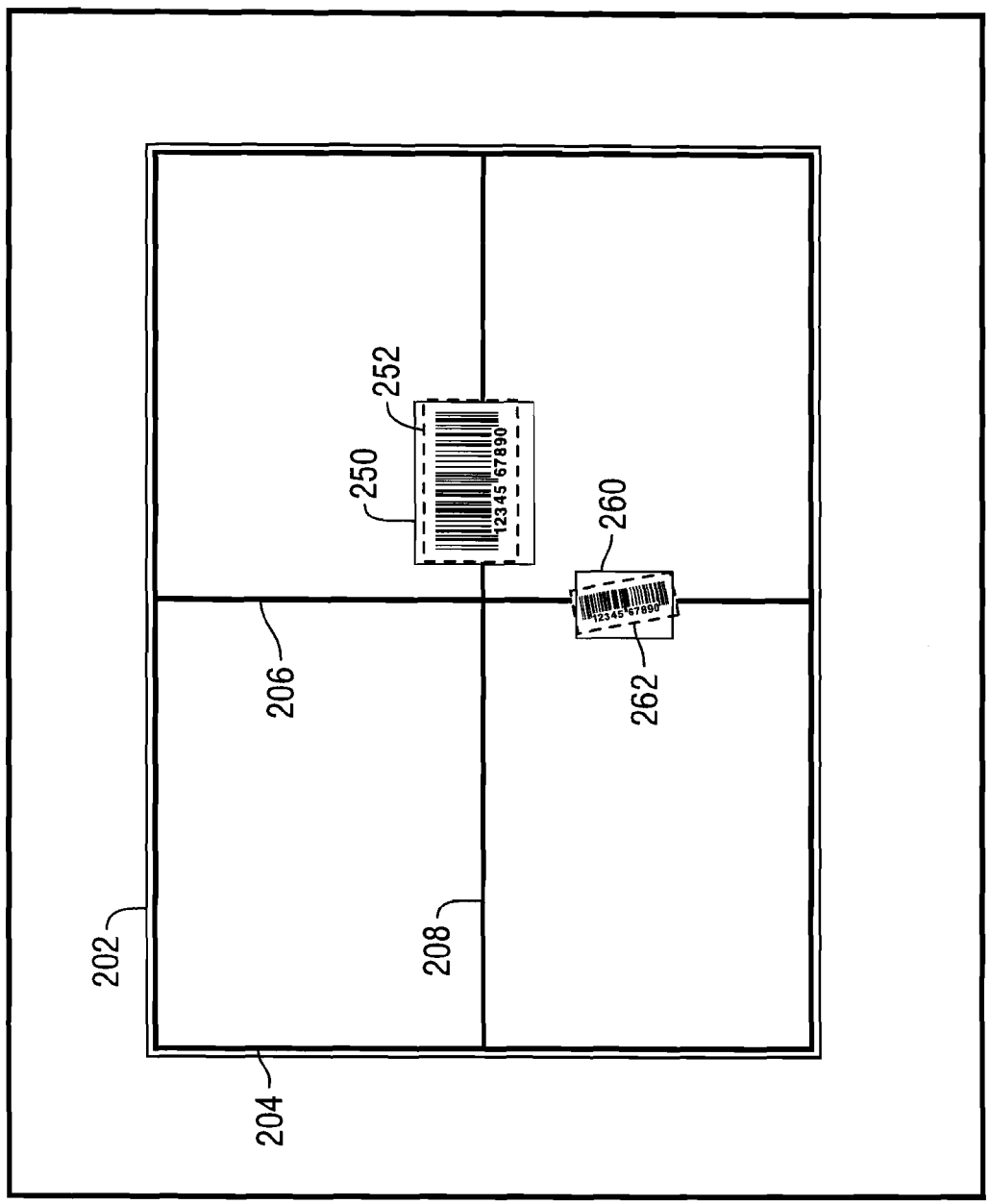
FIGS. 3 and 4 illustrate scan windows suitably employed in a scanner according to an aspect of the present invention.

FIG. 3 illustrates additional features of a scan window such as the scan window 136, showing the imaging area 202 of the imager 140, the border 204, and intersecting lines 206 and 208. The bar code label 250, bearing the bar code 252, can be seen, as can the bar code label 260, bearing the bar code label 262. The bar code label 250 and bar code 252 are placed along the line 206, and the bar code label 260 and label 262 are placed along the line 208, which indicate favorable locations for imaging scanning. For example, more intensive processing may be performed at these portions of the imaging area, and the presence of the lines 206 and 208 indicates these favorable placement locations to a user.

Figure 4:
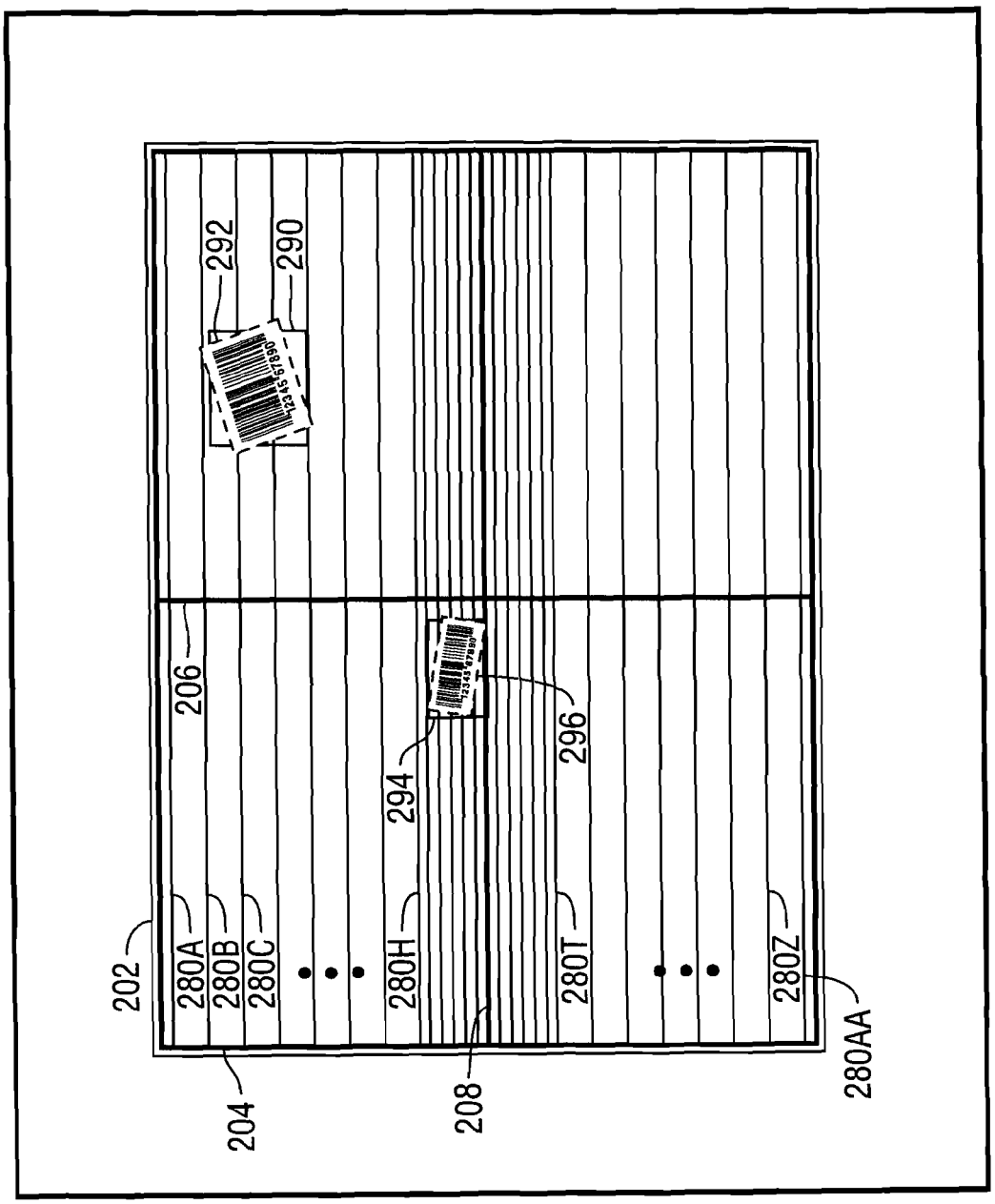

FIG. 4 illustrates a scan window such as the scan window 136, showing the imaging area 202 of the imager 140, again showing the border 204, and intersecting lines 206 and 208. The bar code label 290, bearing the bar code 292 can be seen, as can the bar code label 294, bearing the bar code label 296. In addition, a series of lines 280A . . . 280AA are used to illustrate processing density for the image, with a greater density of lines indicating more intensive processing in an area of the image and a lesser density of lines indicating less intensive processing in an area of the image. In the presently illustrated example, processing includes taking rows and columns of pixels from the image and subjecting them to processing. Rows and columns to be processed may be selected at intervals, to avoid the added processing load that would be required by processing every row of pixels. The lines 280A . . . 280AA indicate the intervals at which processing of rows of pixels is performed, with a smaller interval being observed, and thus a greater intensity of processing being performed, nearer the horizontal line 206. The bar code label 290 and bar code 292 are placed in an area in which the interval between lines is greater, and the bar code label 294 and bar code 296 are placed in an area for in which the interval between lines is less. The bar code 292 is relatively large, and so even with a larger interval between lines that are processed, sufficient lines of pixels including portions of the bar code 292 will be processed. The bar code 296 is relatively small, and placement of the bar code 296 in an area of the image for which more intensive processing is performed, that is in the area of the lines 280H-280T where a smaller interval between lines is observed, provides a higher likelihood that the bar code 296 will be detected and processed. The lines 280H-280T are arranged around the line 206, showing a greater processing density in that area, and the line 206 provides an indication to a user of where a smaller bar code may advantageously be placed.

Figure 5:
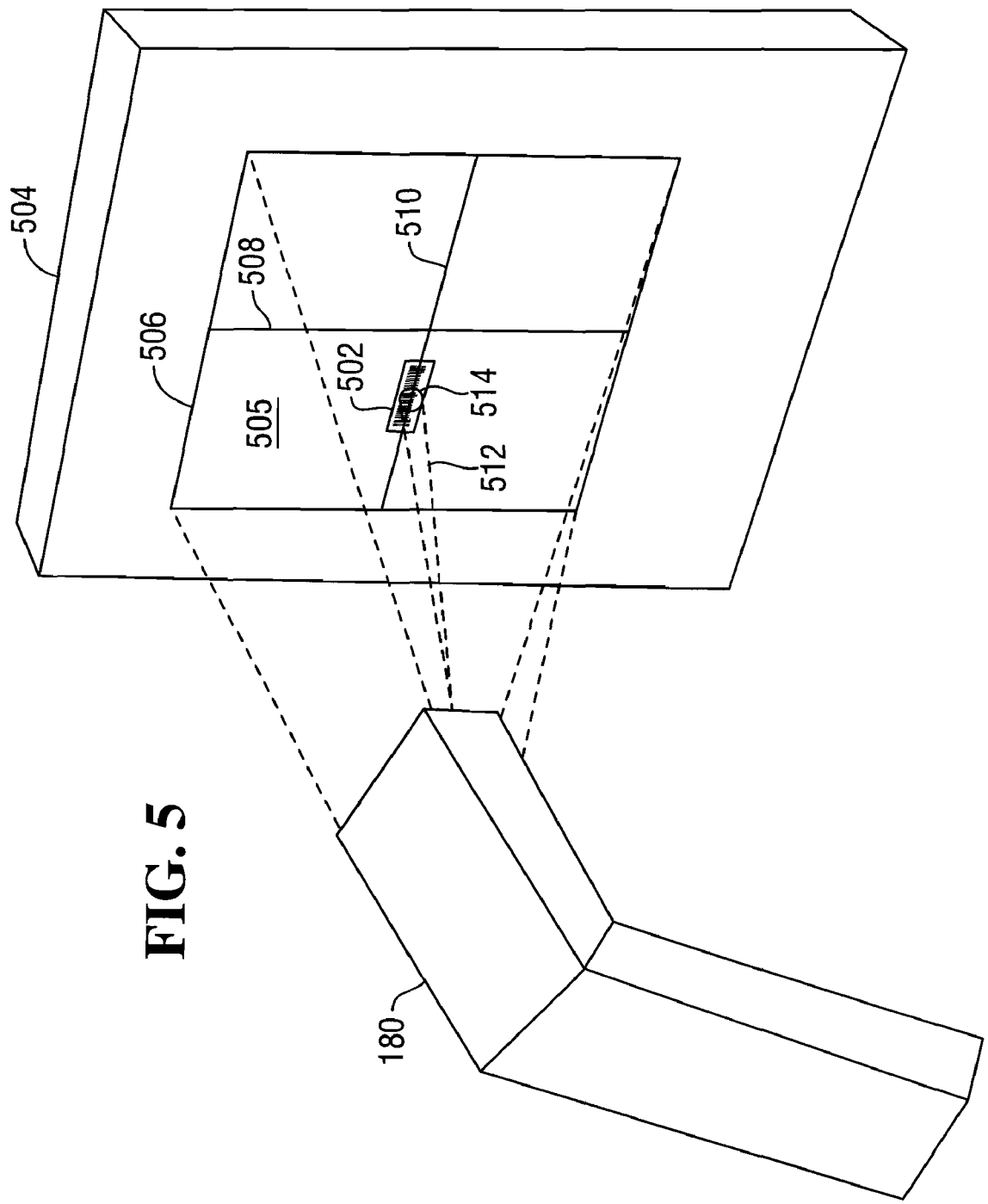
FIG. 5 illustrates a handheld scanner according to an aspect of the present invention.

FIG. 5 illustrates the use of the handheld scanner 180 according to an aspect of the present invention. The scanner 180 is illustrated here as being used to scan a bar code 502 affixed to a box 504. The scanner 180 projects a targeting pattern 505 on the box 504, showing a border 506 and intersecting vertical and horizontal lines 508 and 510. The bar code 502 is shown here as having been placed on the horizontal line 508, which may suitably have been used to indicate an area suitable for imaging scanning, such as an area of the field of view of an imager that is subjected to relatively intensive processing. Also visible is a targeting beam 512, projecting a distance targeting spot 514. The distance targeting spot 514 suitably changes in appearance, such as changing in color, depending on whether an object to be scanned is within a predetermined distance range from an imager used in a scanner such as the scanner 180.

Figure 6:
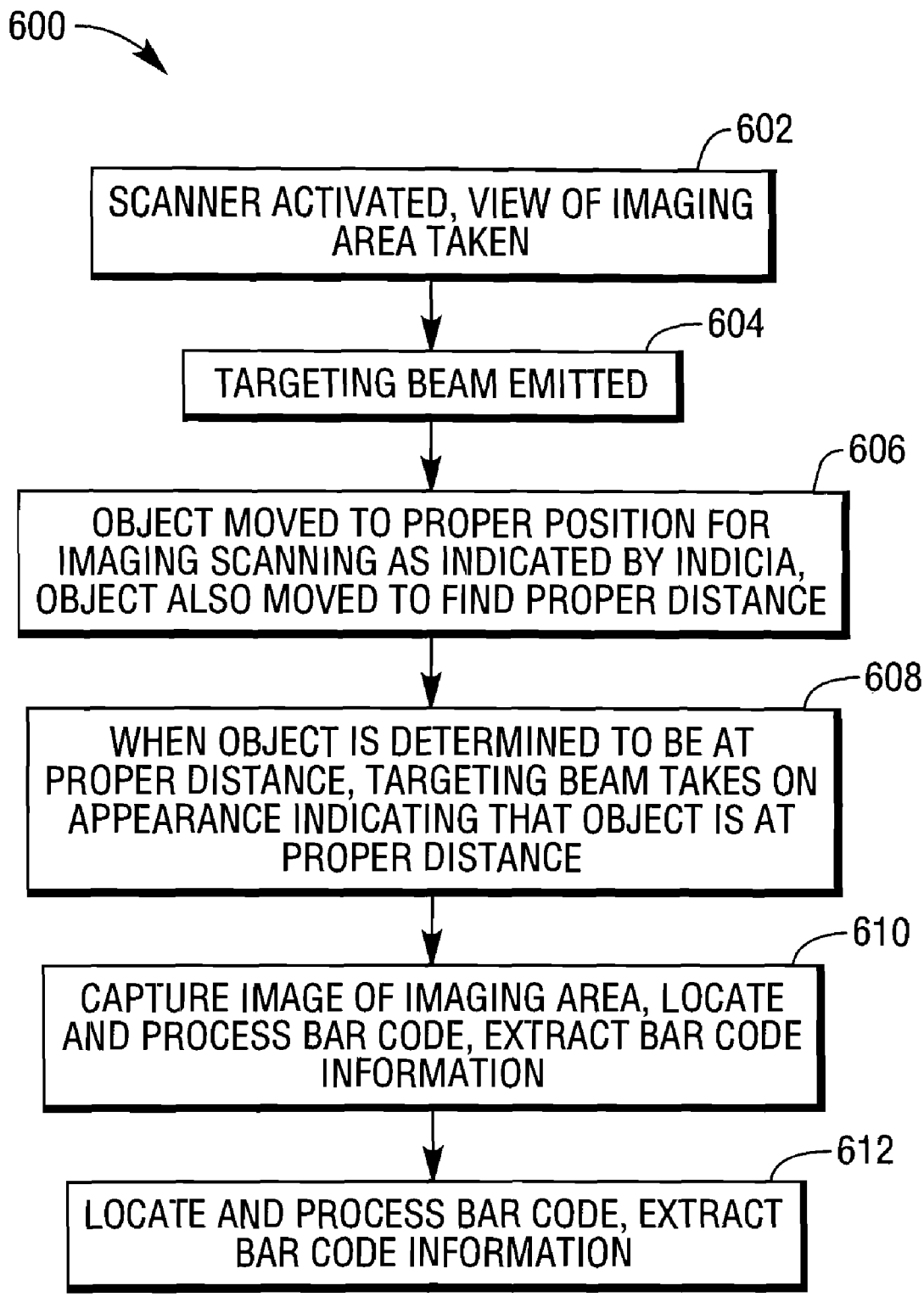
FIG. 6 illustrates a process of imaging scanning according to an aspect of the present invention.

FIG. 6 illustrates a process 600 of imaging checkout according to an aspect of the present invention. At step 602, an imaging scanner is activated for scanning and an imager takes a view of an imaging area. At step 604, a targeting beam is emitted for illumination of a bar code, to help indicate when the bar code is at a proper distance for imaging scanning, such as within a predetermined distance range from an imager at which scanning occurs more easily. At step 606, when a bar code suitable for imaging scanning is to be scanned, the bar code is moved into a position for imaging scanning, with proper positioning being indicated by indicia visible to a user of the scanner. The indicia may indicate positions at which more intensive or less intensive processing of the imaging area occurs, in order to help a user to place a bar code more precisely in cases in which such placement is needed, such as when a smaller bar code is better placed in an area where more intensive processing occurs. The bar code is also suitably positioned so as to be illuminated by the targeting beam and moved so as to put it at an appropriate distance from the imager. At step 608, when the bar code is detected to be at a desired distance from the imager, the targeting beam takes on an appearance indicating that the bar code is at a proper distance. At step 610, an image of the imaging is captured. The captured image provided for processing thus shows the bar code at the desired position and distance. At step 612, the area of the image including the bar code is located and processed and bar code information extracted.

While the present invention is disclosed in the context of a presently preferred embodiment, it will be recognized that a wide variety of implementations may be employed by persons of ordinary skill in the art consistent with the above discussion and the claims which follow below.

I claim:

1. An imaging bar code scanner, comprising:
   imaging elements for capturing an image of a field of view of an imager;
   processing elements for analyzing the image to identify a bar code included in the image and process the image to extract bar code information; and
   indicia indicating desired placement for the bar code, the indicia indicating areas in the field of view of the imager where the bar code may be placed for improved processing of the bar code as compared to other areas, at least some of the indicia indicating areas of the field of view of the imager subjected to relatively more intensive processing, wherein at least some of the indicia appear on a scan window of the scanner indicating areas on the scan window for relatively efficient processing of an image of the bar code when the bar code is placed in the areas indicated.

2. The scanner of claim 1, wherein the indicia further include indicia indicating the boundaries of the field of view of the imager.

3. The scanner of claim 1, wherein at least some of the indicia are emitted from the scanner to create a projected pattern that illuminates a surface in a path of the projected pattern.

4. The scanner of claim 1, wherein the scanner further comprises:
   a sensing mechanism to determine when an object is within a predetermined distance range from an imager used by the scanner; and
   a control mechanism that receives information from the sensing mechanism indicating that the object is within the predetermined distance range and causes at least some of the indicia to change in appearance to indicate that the object is within the predetermined distance range when the information received from the sensing mechanism indicates that the object is within the predetermined distance range.

5. The scanner of claim 4, wherein at least one of the indicia is a targeting beam.

6. The scanner of claim 5, wherein the targeting beam changes color when the information from the sensing mechanism indicates that the object is within the predetermined distance range.

7. The scanner of claim 1, wherein at least some of the indicia indicate areas of the field of view of the imager subjected to relatively less intensive processing and wherein at least some of the indicia include lines appearing on a scan window of the scanner with a greater density of lines indicating an area subjected to relatively more intensive processing and a lesser density of lines indicating an area subjected to relatively less intensive processing.

8. The scanner of claim 1, wherein the scanner is a dual window scanner with vertical and horizontal scan windows and wherein indicia appear on each of the scan windows.

9. The scanner of claim 8, wherein the indicia include a targeting grid including intersecting lines, with each of the intersecting lines indicating an area providing for relatively efficient processing.

10. The scanner of claim 8, wherein the indicia include a targeting grid comprising intersecting lines, with the intersection of the lines indicating an area providing for relatively efficient processing.

11. The scanner of claim 1, wherein the scan window is illuminated with a pattern comprising the indicia.

12. A method of image scanning, comprising the steps of:
    activating an image scanner;
    determining whether a bar code has been placed into an appropriate area of the field of view of the imager as indicated by indicia defining areas of the field of view of the imager for relatively efficient processing of the bar code, at least some of the indicia indicating areas of the field of view of the imager subjected to relatively more intensive processing, wherein at least some of the indicia appear on a scan window of the scanner, indicating areas on the scan window that provide for relatively efficient processing of an image of the bar code when the bar code is placed in the areas indicated;
    upon determining that the bar code has been placed into the appropriate area of the field of view, capturing an image of the field of view of the imager; and
    processing the image to locate the bar code and extract bar code information.

13. The method of claim 12, wherein the indicia further include indicia indicating the boundaries of the field of view of the imager.

14. The method of claim 12, wherein the step of activating the scanner further comprises emitting indicia from the scanner to create a projected pattern that illuminates a surface in a path of the projected pattern.

15. The method of claim 12, further comprising a step of receiving information from a sensor indicating that an object is within a predetermined distance range from an imager used by the scanner and a step of directing a control mechanism to change the appearance of at least some of the indicia to indicate that the object is within the predetermined distance range when the information from the sensor indicates that the object is within the predetermined distance range.

16. The method of claim 15, wherein at least some of the indicia include a targeting beam that changes in appearance depending on whether an object is within or outside the predetermined distance range.

17. The method of claim 12, wherein some of the indicia indicate areas of the field of view of the imager subjected to relatively less intensive processing and wherein the indicia include lines appearing on a scan window of the scanner with a greater density of lines indicating an area subjected to relatively more intensive processing and a lesser density of lines indicating an area subjected to relatively less intensive processing.

* * * * *